Dec. 22, 1959

O. M. STUETZER 2,918,628

SEMICONDUCTOR AMPLIFIER

Filed Jan. 23, 1957

INVENTOR.
OTMAR M. STUETZER
BY Wade Koontz
ATTORNEY
Richard J. Killoren
AGENT

United States Patent Office 2,918,628

Patented Dec. 22, 1959

2,918,628

SEMICONDUCTOR AMPLIFIER

Otmar M. Stuetzer, Hopkins, Minn., assignor to the United States of America as represented by the Secretary of the Air Force Application January 23, 1957, Serial No. 635,925

6 Claims. (Cl. 330—39)

(Granted under Title 35, U.S. Code (1952), sec. 266)

The invention described herein may be manufactured and used by or for the United States Government for governmental purposes without payment to me of any royalty thereon.

This invention relates to a semiconductive amplifying device which resembles a vacuum tube in its performance.

Another object is to provide a semiconductive amplifying device which has a high transconductance.

These and other objects are accomplished by making use of an approximate transconductance formula to indicate how certain improvements can be made to increase the transconductance.

In the drawing, Fig. 1 is a diagrammatic showing for illustrating certain features of the invention.

Figure 1:
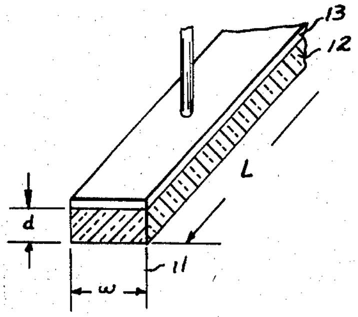

Certain features of the invention can be best described with reference to Fig. 1 of the drawing and to the following approximate formula for the transconductance:

$$G_m = \frac{mb\epsilon LV_{11}}{dw} \qquad (1)$$

This formula can be derived as follows:

A charge Q influenced by an applied D.C. voltage $V_g$ in a condenser with dielectric constant $\epsilon$, an area $wL$ and separation $d$ is:

$$Q = \frac{\epsilon wLV_g}{d} \qquad (2)$$

This influenced charge can be assumed to be either a surface charge or to have an effective depth T. It shall be assumed to have a thickness T, since it will turn out that this term will cancel from the final formula. The charge density in a volume $wLT$ is $Q/wLT$ a part, which depends upon the efficiency coefficient M, is defined as being mobile. Now if we introduce the mobile carrier density N and the elementary charge $q$, then $q$N is the mobile charge density and the following relationship is obtained from (2) above.

$$\frac{mQ}{wLT} = \frac{\epsilon V_g m}{dT} = qN \qquad (3)$$

If a field $$E = \frac{V_{11}}{w}$$

accelerates this charge then the current density $j$ is given by the product of the mobile charge density $q$N, mobility $b$ and field strength $$\frac{V_{11}}{w}$$

($V_{11}$ is equal to $V_a$ of Fig. 2 if the conductivity of parts 14 and 15 and the load resistor $R_2$ is high) thus:

$$j = \frac{qNbV_{11}}{w} = \frac{m\epsilon V_g bV_{11}}{dTw} \qquad (4)$$

The current $I_a$ is then obtained by multiplying the current density $j$ by the cross sectional area LT, thus:

$$I_a = jLT = \frac{mb\epsilon LV_{11}V_g}{dw} \qquad (5)$$

The transconductance $G_m$ is defined as the derivative of $I_a$ vs. $V_g$. Thus the formula for transconductance is:

$$G_m = \frac{\delta I_a}{\delta V_g} = \frac{mb\epsilon LV_{11}}{dw} \qquad (6)$$

It can be seen from the formula that the terms $m$, $b$, $\epsilon$, L and $V_{11}$ must be large and $d$ and $w$ must be small to obtain a high transconductance. The efficiency coefficient $m$ depends upon the resistivity of the semiconductor and also on the cleanliness and treatment of the surface. The surface can be treated in several ways, all of which amount to cleaning of the surface. These are: anodic oxidation, cleaning through a gas discharge and bombardment with electrons or ions.

The mobility of the influenced carriers $b$ can be increased by choosing the semiconductive material. The voltage $V_{11}$ across the semiconductive material must be high, which calls for a material with high resistivity. Germanium, silicon or titanium oxide are suitable materials for the semiconductor. If germanium is used, preferably in the form of a single crystal, high mobility is gained, but the voltage $V_{11}$ is comparatively low, whereas for silicon the reverse is true leading to about the same transconductance. The dielectric constant $\epsilon$ of the medium 12 should be high and can be increased by drenching the dielectric material with a polar liquid such as nitrobenzene or other liquid with a high dipole moment. The symbols L, $w$ and $d$ refer to the dimensions shown in Fig. 1. The length L can be increased in various ways, which will be explained later. Breakthrough sets a minimum limit for the dimensions $d$ and $w$. By using the approximate formula to indicate where certain compromises should be made, it is possible to increase the transconductance.

Figure 2:
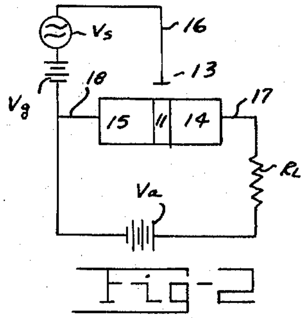
Fig. 2 is a circuit schematic of the amplifying device of the invention.

Fig. 2 indicates how the various voltages are applied to the amplifying device. Control electrode bias voltage $V_g$ and signal voltage $V_s$ are connected in the control electrode circuit. A voltage source $Va$ and a load $R_L$ are connected between leads 17 and 18.

Figures 3, 4, 5, 6, 8:
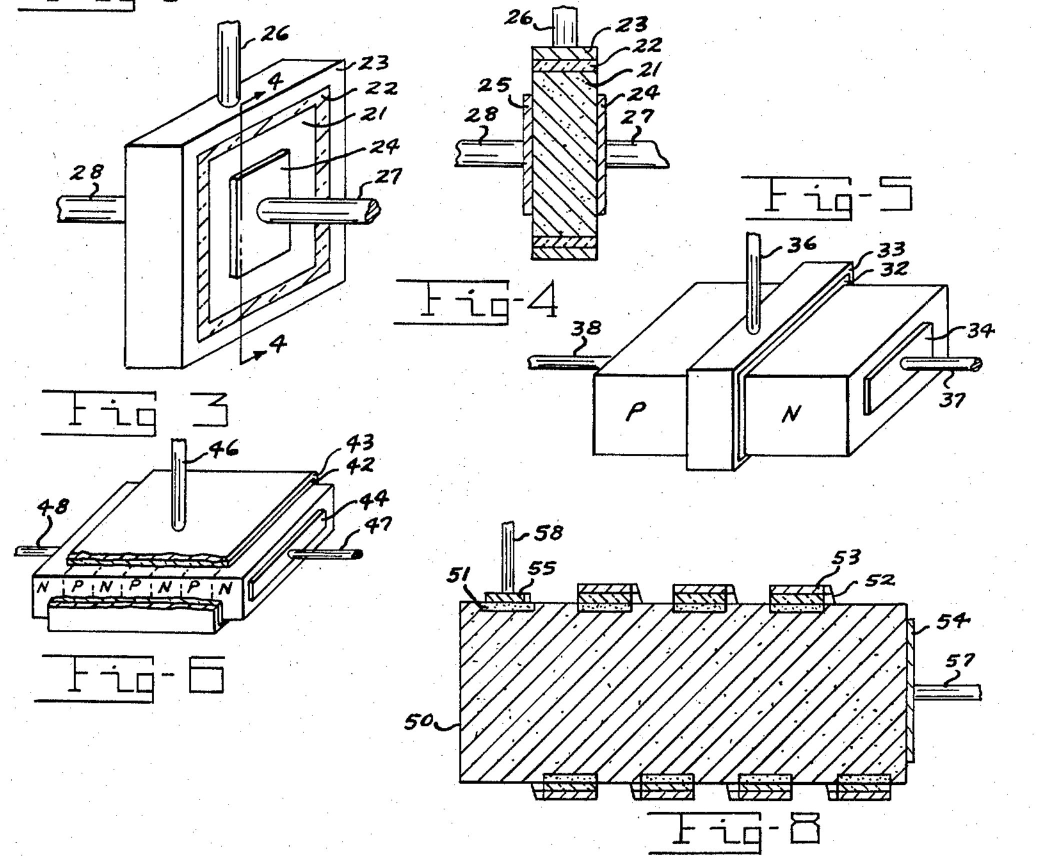
Fig. 3 is an isometric view of one embodiment of the invention.
Fig. 4 is a sectional view along the line 4—4 of Fig. 3.
Fig. 5 shows an embodiment of the invention as applied to a P–N junction type device.
Fig. 6 illustrates an embodiment wherein several P–N junctions are connected in series.
Fig. 8 is a sectional view along the line 8—8 of Fig. 7.

In the device of Figs. 3 and 4, reference numeral 21 illustrates a thin sheet of a semiconductor such as germanium which is $10^{-3}$ cm. or thinner. A pair of electrodes 24 and 25 make ohmic contact with the thin sheet. A layer of dielectric material 22, which has been drenched in a polar liquid is applied to the thin edge of the sheet. A conductive layer 23 is applied over the dielectric layer. The conductive layer has a signal applied to it and therefore acts as a control electrode. The dielectric layer and conductive layer can be formed by pressing a strip of aluminum, which has been oxidized on one side, against the thin edge of the semiconductive sheet, which has been optically ground. Devices of this type have an extremely good frequency response.

A practically built device had the following respective values:

Girth $L=.5$ cm., thickness of dielectric; $d=10^{-3}$ cm., anode voltage $V_{11}=15$ volts; width $w=10^{-3}$ cm., mobility of the electrons (germanium), $b=2400$ cm.$^2$/volt sec.; dielectric constant (nitrobenzene-glycerine mixture) $\epsilon=20\times10^{-14}$ amp. sec./volt cm. The surface states efficiency $m$ was measured to be about .1. This yielded a transconductance according to the formula mentioned above of $35\times10^{-4}$ amp./volt=3500 micromhos. In the device of Fig. 5, use is made of a P–N junction type semiconductive device which is biased in the direction of high resistance. In this case, all of the carriers are drained from the transition part between the P and N regions, leaving a region of extremely high resistivity of around $10^{-4}$ cm. thickness, between the two blocks of material with relatively low resistivity. Control electrode 33 is applied to the block in the same manner as in the device of Fig. 3.

In the device of Fig. 6, several P–N junctions are connected in series. Control electrode 43 is made wide enough to cover all of the junctions. The device is otherwise the same as the device of Fig. 5.

Figure 7:
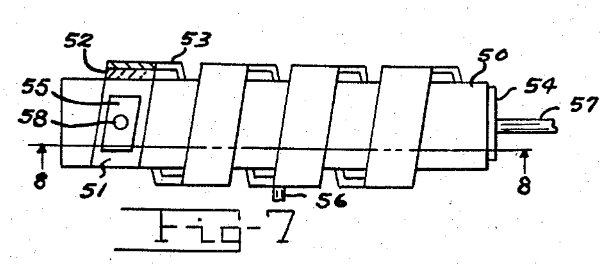
Fig. 7 illustrates an embodiment of the invention wherein a helical P–N junction is provided to increase the length of the control region.

The length of the control region can be increased in the manner shown in the device of Figs. 7 and 8. A block of N-type germanium 50 has indium deposited on its surface in a helical pattern to change the N-type germanium to P-type germanium. A dielectric layer 52 and a conductive layer 53 are applied to the block over all the P-type region except a small portion 51 to which terminal electrode 58 is applied. The control signal and voltages can be applied to all of the species in the manner shown in Fig. 2.

There is thus provided a semiconductive device which resembles a vacuum tube in its operation and which has a high transconductance.

While certain specific embodiments of the invention have been described in detail, it will be understood that numerous changes may be made without departing from the general principles and scope of the invention.

I claim:

1. A semiconductive amplifying device having a first thin region of semiconductive material with high resistivity between two regions of material with low resistivity, an elongated control electrode substantially surrounding said semiconductive device adjacent the thin edge of said high resistivity region, a polar liquid drenched dielectric material with a thickness of approximately $10^{-3}$ cm. between said control electrode and said material with high resistivity, a bias source and signal input means connected between said control electrode and one of said regions of low resistivity and a voltage source and load in a circuit between said two regions of low resistivity.

2. A semiconductive amplifying device comprising a thin sheet of semiconductive material with high resistivity in the form of a single crystal, a terminal electrode on each flat surface of said sheet, a voltage source and load means connected between the terminal electrodes, a control electrode adjacent and surrounding thin edge of said sheet, a layer of polar liquid drenched dielectric material between said control electrode and said thin sheet, a bias source and a signal source connected to said control electrode.

3. A semiconductive device comprising a thin sheet of semiconductive material with high resistivity with a thickness of less than $10^{-3}$ cm. in the form of a single crystal, a thin layer of polar liquid drenched dielectric material with a thickness of approximately $10^{-3}$ cm. surrounding the thing edge of said sheet of semiconductive material, a layer of conductive material on said dielectric layer and coextensive therewith forming a control electrode, a pair of terminal electrodes with one on each of the flat surfaces of the thin sheet of semiconductive material and lead means connected to said control electrode and said terminal electrodes.

4. A semiconductive amplifying device comprising a P–N junction type device having a pair of terminal electrodes, means connected to said electrodes to bias the junction in the high resistance direction, a control electrode surrounding the high resistance junction, a layer of polar liquid drenched dielectric material between the control electrode and the high resistance junction, a bias source and a signal input means connected between said control electrodes and one of said terminal electrodes and a voltage source and load in a circuit connected between said two terminal electrodes.

5. A semiconductive amplifying device comprising a plurality of P–N junction type devices connected in series, a pair of terminal electrodes connected to the opposite ends of said device, means to bias the junctions in the high resistance direction, a control electrode surrounding said device and covering all of the high resistance junctions, a layer of polar liquid drenched dielectric material between the control electrode and the high resistance junctions, bias source and a signal input means connected between said control electrode and one of said terminal electrodes and a voltage source and a load in a circuit connected between said two terminal electrodes.

6. A semiconductive amplifying device comprising a block of N-type germanium, a thin layer of P-type germanium surrounding said block in the form of a helix, a layer of polar liquid drenched dielectric material covering all but a small portion of said layer of P-type germanium, a layer of conductive material on said dielectric layer to form a control electrode, a first terminal electrode connected to the exposed portion of said P-type germanium, a second-terminal electrode connected to said block of N-type germanium and a bias source and signal input means connected between said control electrode and one of said terminal electrodes and a voltage source and load in a circuit connected between said two terminal electrodes.

References Cited in the file of this patent

UNITED STATES PATENTS

| | | |
|---|---|---|
| 1,900,018 | Lilienfeld | Mar. 7, 1933 |
| 2,524,033 | Bardeen | Oct. 3, 1950 |
| 2,524,034 | Brattain et al. | Oct. 3, 1950 |
| 2,569,347 | Shockley | Sept. 25, 1951 |
| 2,612,567 | Stuetzer | Sept. 30, 1952 |
| 2,618,690 | Stuetzer | Nov. 18, 1952 |
| 2,816,850 | Haring | Dec. 17, 1957 |
| 2,829,075 | Pankove | Apr. 1, 1958 |